(12) United States Patent
Lucari et al.

(10) Patent No.: US 10,731,391 B2
(45) Date of Patent: Aug. 4, 2020

(54) SUCTION-SECURITY SYSTEM

(71) Applicants: James E. Lucari, Meadow Vista, CA (US); Don D. McCracken, Jr., Sacramento, CA (US); Nicole A. Reading, Loomis, CA (US)

(72) Inventors: James E. Lucari, Meadow Vista, CA (US); Don D. McCracken, Jr., Sacramento, CA (US); Nicole A. Reading, Loomis, CA (US)

( * ) Notice: Subject to any disclaimer, the term of this patent is extended or adjusted under 35 U.S.C. 154(b) by 0 days.

(21) Appl. No.: 16/143,299

(22) Filed: Sep. 26, 2018

(65) Prior Publication Data
US 2019/0093400 A1 Mar. 28, 2019

Related U.S. Application Data

(60) Provisional application No. 62/564,166, filed on Sep. 27, 2017.

(51) Int. Cl.
| | | |
|---|---|---|
| *F16B 47/00* | (2006.01) | |
| *E05C 19/00* | (2006.01) | |
| *E05B 35/00* | (2006.01) | |
| *E05B 13/00* | (2006.01) | |
| *E05B 47/00* | (2006.01) | |
| *E05B 65/52* | (2006.01) | |
| *E05B 73/00* | (2006.01) | |
| *E05B 51/02* | (2006.01) | |

(52) U.S. Cl.
CPC ............ *E05C 19/00* (2013.01); *E05B 13/002* (2013.01); *E05B 35/008* (2013.01); *E05B 47/0038* (2013.01); *E05B 51/02* (2013.01); *E05B 65/52* (2013.01); *E05B 73/00* (2013.01); *E05B 47/0045* (2013.01); *F16B 47/006* (2013.01)

(58) Field of Classification Search
CPC .. E05B 13/002; E05B 35/008; E05B 47/0038; E05B 65/52; E05B 47/0045; E05C 19/00; F16B 47/006
USPC ................ 248/205.7, 205.8, 309.3, 362, 363
See application file for complete search history.

(56) References Cited

U.S. PATENT DOCUMENTS 2,233,870 A * 3/1941 Muter ..................... F16B 47/00
248/205.8
2,420,811 A * 5/1947 Brewster .............. B65G 49/061
294/187

(Continued)

FOREIGN PATENT DOCUMENTS

| EP | 1338808 B1 | 8/2003 |
| FR | 2318996 A2 | 2/1977 |

(Continued)

*Primary Examiner* — Tan Le
(74) *Attorney, Agent, or Firm* — David Millers

(57) ABSTRACT

A suction-security system includes an adhesion membrane coupled to a swing arm. Rotation of the swing arm lifts a center portion of the adhesion membrane, creating suction and adhesion of the suction-security system to an anchor surface. The swing arm may have a low profile enabling use of the suction security system in an enclosure with minimal loss of available interior space. The system may include a shield protecting the adhesion membrane, and a bushing in the shield permits rotation of a portion of the shield without disturbing adhesion of the adhesion membrane to the anchor surface. The suction-security system may be used in consumer items such as purses, backpacks, briefcases, and suitcases.

17 Claims, 6 Drawing Sheets

(56) References Cited

U.S. PATENT DOCUMENTS

| | | | |
|---|---|---|---|
| 2,940,713 A | | 6/1960 | Van Dusen |
| 3,736,779 A | | 6/1973 | Pratt |
| 4,029,370 A | | 6/1977 | Ziegel et al. |
| 4,133,575 A | | 1/1979 | Mader |
| 5,348,168 A | | 9/1994 | Emery |
| 5,961,087 A | * | 10/1999 | Lee ................... F16B 47/00 248/205.5 |
| 5,970,860 A | * | 10/1999 | Yip ................... A47J 43/07 241/169.1 |
| 6,045,111 A | | 4/2000 | Hsieh |
| 6,170,894 B1 | | 1/2001 | Baker et al. |
| 6,478,271 B1 | * | 11/2002 | Mulholland ............ F16B 47/00 248/205.8 |
| 7,226,026 B2 | * | 6/2007 | Lin ................... B60R 11/00 248/183.1 |
| 7,338,020 B2 | * | 3/2008 | Magid ................ F16B 47/006 248/205.5 |
| 8,079,557 B2 | | 12/2011 | Tu et al. |
| 2006/0284043 A1 | | 12/2006 | Paradise et al. |
| 2008/0217826 A1 | | 9/2008 | Kim |
| 2009/0050758 A1 | * | 2/2009 | Carnevali ............. F16B 47/00 248/205.8 |
| 2015/0369276 A1 | | 12/2015 | Balmer et al. |

FOREIGN PATENT DOCUMENTS

| | | |
|---|---|---|
| JP | 2010121664 A | 6/2010 |
| WO | 2006138335 A3 | 12/2006 |
| WO | 2008123692 A1 | 10/2008 |

\* cited by examiner

SUCTION-SECURITY SYSTEM

CROSS-REFERENCE TO RELATED APPLICATIONS

This patent document is a claims benefit of the earlier filing date of U.S. provisional Pat. App. No. 62/564,166, filed Sep. 27, 2017, which is hereby incorporated by reference in its entirety.

BACKGROUND

Some security or antitheft systems secure items by making the items difficult to move. For example, a bicycle may be attached to an anchor such as a tree or a bicycle rack using locks and chains or cables, making the bicycle difficult to move away from the anchor. Similar cables and locks have been used to security electronic devices such as computers. Such security systems generally required specific types of immobile anchors that may be unavailable or inconvenient to use in many locations.

Many techniques have been used to attach items together, but few of the known attachment techniques have been suitable and convenient for portable security or antitheft systems. In particular, a portable security attachment system would ideally be usable in a wide variety of different environments, would be simple to activate, would be secure against unauthorized removal, and yet simple for an authorized user to release.

SUMMARY

In accordance with an aspect of the invention, a suction-security system may be built into or otherwise attached to an item such as a purse, a suitcase, a briefcase, a laptop case, backpack, or other item needing to be secured. The suction-security system may be deployed on any sufficiently smooth surface and activated to create suction that prevents the removal or movement of the item from the surface. The suction-security system may, for example, adhere to any relatively smooth surface such as a table or a tiled or wood floor. Use of the suction-security system may thus be widely available without need for an anchor specifically designed for security and may be available where and when an attachment point for a traditional cable or chain is unavailable or will not work. An activation/deactivation mechanism of the suction-security system may be inside an enclosure defined by the item, and the enclosure, suction-security system, or both may be lockable to prevent unauthorized deactivation. The suction-security system may thus prevent theft.

In accordance with another aspect of the invention, a portable suction-security system can provide a low-profile suction mechanism that may be quickly activated for a secure or stable attachment that an authorized user may quickly release. A suction-security system may particularly include a swing arm coupled to an adhesion membrane via a post, and rotation of the swing arm in a horizontal plane, i.e., about an axis extending through the post, lifts the post and lifts a central portion of the adhesion membrane to create or release suction. The swing arm and the rotations of the swing arm for activation or deactivation are compact and may have minimized height for a low profile mechanism. The swing arm may optionally include a lock mechanism such as a removable key or a magnetically activated locking pin.

In accordance with yet another aspect of the invention, a shield or anti-pry structure surrounding an adhesion membrane in a suction-security system may be attached to the adhesion membrane using a bushing that permits rotation of the shield relative to the adhesion membrane. The bushing connection may thwart attempts to rotate the adhesion membrane to break suction. In particular, rotation of accessible portions of a suction-security system, e.g., the shield, the anti-pry structure, or any external components affixed to shield, do not rotate the adhesion membrane, allowing the adhesion membrane to maintain secure adhesion to an anchor surface. The shield may optionally include a wall ring that presses on a perimeter of the adhesion membrane during activation of suction, and the wall ring may be rotatable relative to external portions of the shield so that the wall ring does not apply torque to the adhesion membrane when the shield is rotated.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

A low-profile high-adhesion suction-security system can create a suitable vacuum for adhesion of the suction-security system to a less moveable anchor surface. The suction-security system may have a low profile that is compact and permits use in applications having minimal vertical clearance. One particular embodiment employs a rotational ramp swing arm that aids in providing the low-profile required for use inside thin enclosures such as in a briefcase while still providing lift of a membrane to create or activate high-adhesion suction. The suction-security system is thus ideal for low-profile applications where an enclosure or platform requires attachment to a less moveable anchor surface, but the suction-security systems is also applicable for security where a low profile is not required.

The following discussion is directed to various embodiments. Although one or more of these embodiments may be discussed in detail, the embodiments disclosed should not be interpreted or otherwise used as a limit to the scope of the disclosure including the claims. One skilled in the art will understand that the following description has broad application, and the discussion of any embodiment is meant only to be an example and is not intended to suggest that the scope of the disclosure, including the claims, is limited to that example.

Figure 1A:
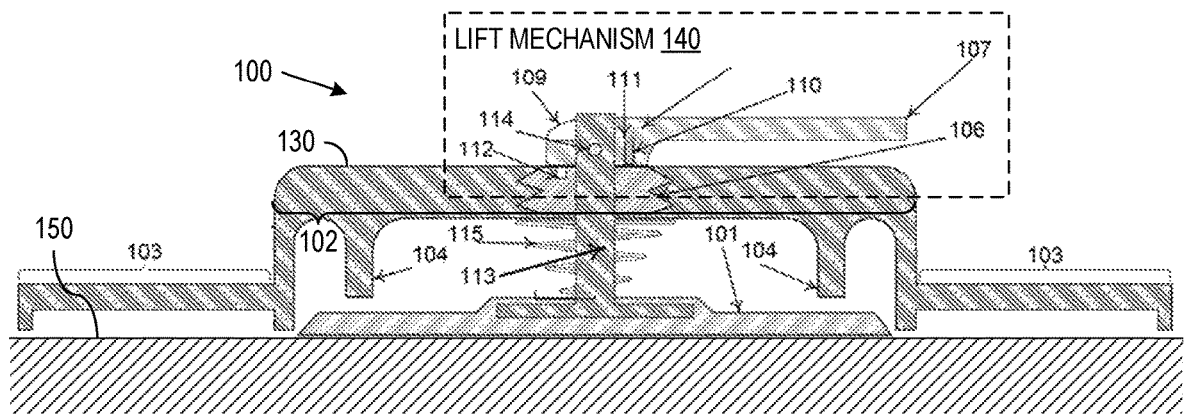
FIG. 1A is a cross-sectional view of an embodiment of a suction-security system when security suction is disengaged.
Figure 1B:
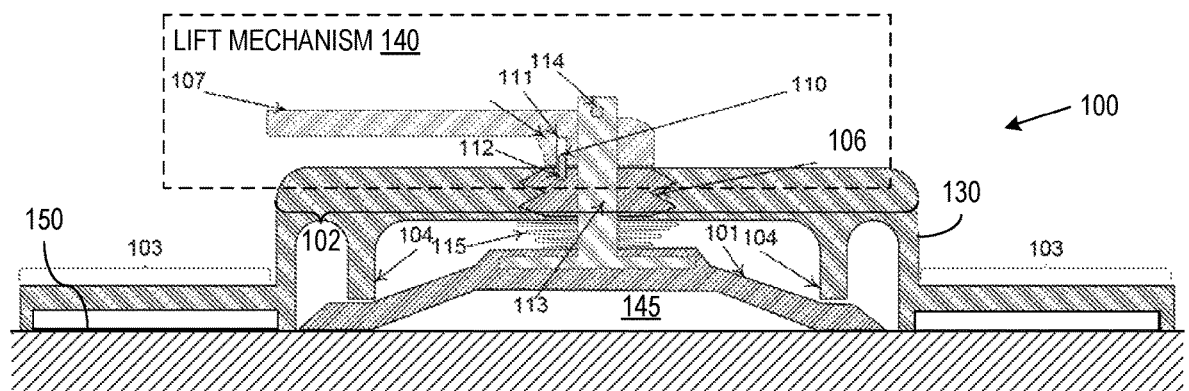
FIG. 1B is a cross-sectional view of the suction-security system of FIG. 1A when a rotational ramp swing arm is rotated to engage suction.
Figure 1C:
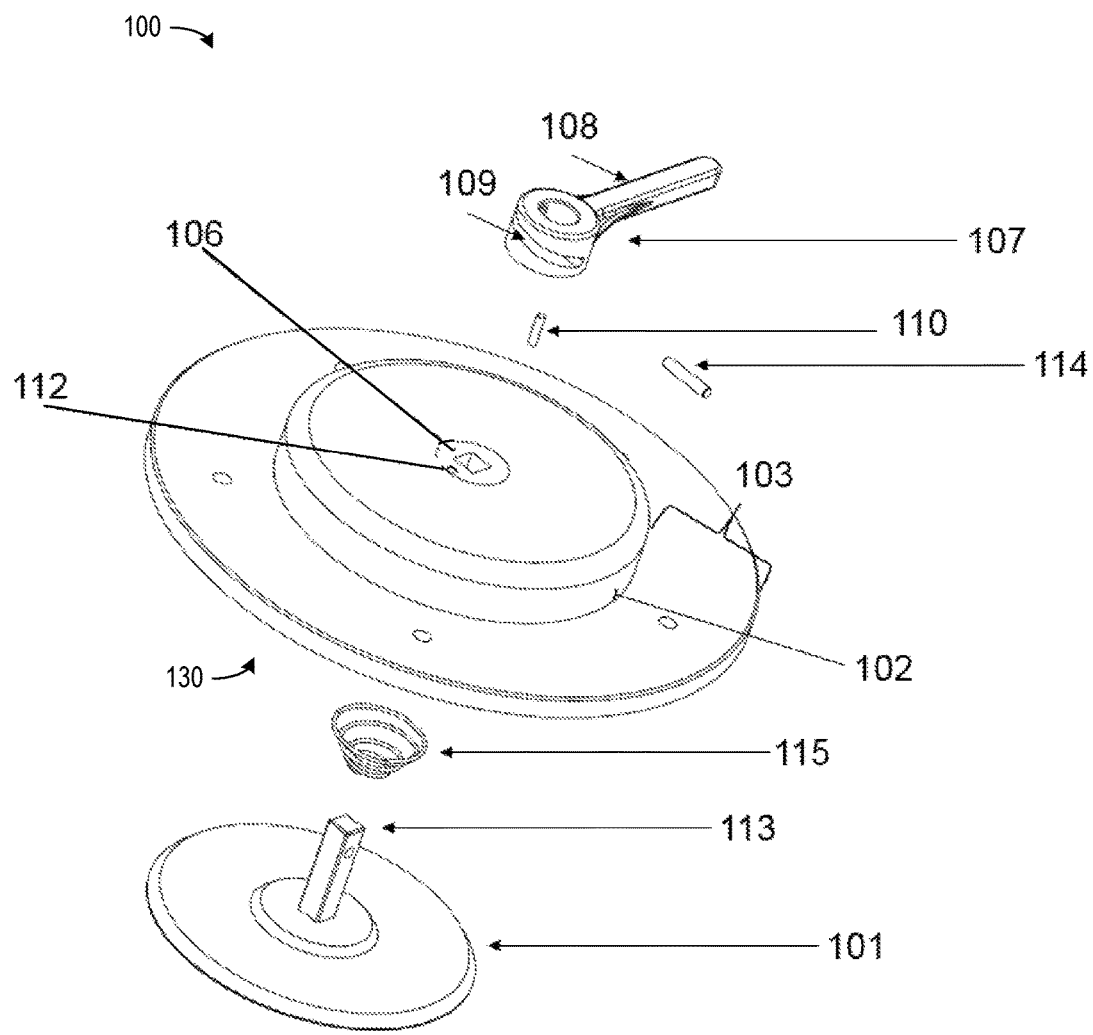
FIG. 1C is an exploded view of the suction-security system of FIG. 1A.

FIGS. 1A, 1B, and 1C show a suction-security system 100 in accordance with one embodiment of the invention. FIG. 1A particularly shows a cross-section of suction-security system 100 on an anchor surface 150 before adhesion is activated. FIG. 1B shows a cross-section of suction-security system 100 after adhesion is activated to adhered suction-security system 100 to anchor surface 150. FIG. 1C shows an exploded view illustrating components of suction-security system 100. Suction-security system 100 particularly includes an adhesion membrane 101, a lift mechanism 140 attached to adhesion membrane 101, and a shield or anti-pry structure 130 surrounding membrane 101.

Adhesion membrane 101 may be a disk or otherwise shaped membrane of a flexible material such as a semi-firm rubber or silicone material with a shape that matches a depression wall 104 that may be part of anti-pry structure 130 surrounding adhesion membrane 101. In an example implementation, adhesion membrane 101 is circular and about 3 inches in diameter, but adhesion membrane 101 can alternatively be sized and shaped to meet an application's requirements, e.g., having a size and shape matching those of an object being secured or to provide a desired force of adhesive. In general, the material used in adhesion membrane 101 may be selected for flexibility, tackiness, and strength. The size or diameter of membrane 101 may be selected so that the external air pressure on adhesion membrane 101 when suction is activated is sufficient to provide a desired force of adhesion to resist movement of suction-security system 100. The thickness of membrane 101 may be selected to provide sufficient strength to resist tearing or warping when an expected level of external force is applied to move suction-security system 100. The thickness of membrane 101 may also be related to the geometry of depression walls 104 that press the perimeter of membrane 101 against anchor surface 150 during engagement of suction-security system 100.

Figure 2:
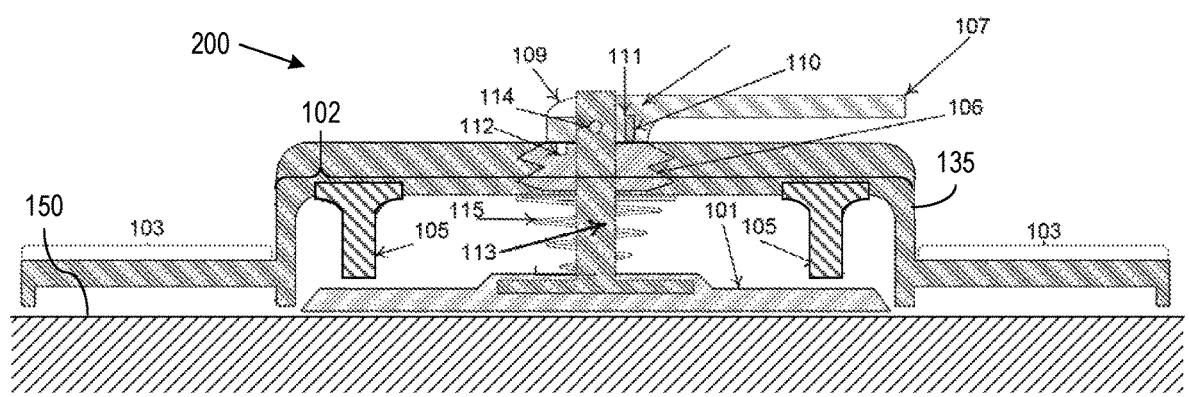
FIG. 2 is a cross-sectional view of an embodiment of a suction-security system with a rotatable depression wall ring.

Shield or anti-pry structure 130 includes a central portion 102 that surrounds the top surface of membrane 101 and may further include an optional extension 103. Anti-pry structure 130 may be made of a hardened polyvinyl chloride (PVC) or other ridged and sturdy lightweight material. With the illustrated implementation of suction-security system 100, anti-pry structure 130 may be molded form one-piece structure including central portion 102, extension 103, and depression wall 104. Alternatively, as shown in FIG. 2, a suction-security system 200 can include an alternative shield or anti-pry structure 135 in which central portion 102 and optional extension 103 are parts of a one-piece structure that is a separate component from a depression wall ring 105, and depression wall ring 105 may be free to rotate relative to central portion 102 and optional extension 103. Accordingly, comparing suction security systems 100 and 200, depression wall ring 105 used in suction-security device 200 of FIG. 2 replaces depression wall 104 of suction-security system 100. Depression wall ring 105 may ride firmly yet easily within a channel in an external portion of anti-pry structure 135 allowing adhesion membrane wall ring 105 to rotate within the external portion of anti-pry structure 135, mitigating the chance of suction loss during an attempt to twist or rotate suction-security system 200.

Various applications of suction-security device 100 or 200 can use or omit optional extension 103. In some implementations, an enclosure, container, platform, backpack or similar object can attach to suction-security system 100 or 200 particularly by attaching to extension 103. In other implementations, extension 103 is not required, and an enclosure, container, platform, backpack or similar object can attach directly to the central portion 102 of anti-pry structure 130 or 135. Holes can be drilled to provide for rivets or bolts to hold an enclosure, container, platform, backpack, or other object to central portion 102 or extension 103 depending upon security requirements. Attachments that are formed within central portion 102 or depression wall 104 or 105 of anti-pry structure 130 or 135 may be sealed to help avoid loss of vacuum under adhesion membrane 101.

Anchor surface 150 is not part of suction-security system 100 but may be a surface of any convenient relatively immobile object such as a table, a wall, or a floor. More generally, anchor surface 150 may be any surface suitable for sealing against adhesion membrane 101 and allowing creation of the suitable vacuum required for operation. Surface types may be, but are not limited to, glass, tile, vinyl, linoleum, marble, fiberglass, PVC, varnished wood, or other such surfaces that are without irregularities that allow leakages through the seal between adhesion membrane 101 and surface 150.

FIG. 1A shows suction-security system 100 before lift mechanism 140 is activated to attach or adhere suction-security system 100 to anchor surface 150. Lift mechanism 140, when activated, lifts a central area of membrane 101 as shown in FIG. 1B, while a perimeter of membrane 101 may be held or pressed against anchor surface 150, e.g., by depression walls 104 of suction-security system 100 or by depression wall ring 105 for suction-security system 200. The lifting of the central area of membrane 101 creates suction, e.g., a suitable vacuum, in a volume 145 between membrane 101 and anchor surface 150 so that membrane 101, suction-security system 100, and any object attached to suction-security system 100 adheres to anchor surface 150 and is difficult to move.

Lift mechanism 140 in suction-security system 100 employs a membrane lifting post 113, which may be molded into adhesion membrane 101 or may otherwise be attached to a central area of membrane 101. Membrane lifting post 113 needs to lift the center of adhesion membrane 101 in a manner that keeps a seal for the vacuum created in volume 145 when the center of adhesion membrane 101 is lifted. Membrane lifting post 113 may be constructed out of a strong material such as a hard aluminum or steel as membrane lifting post 113 may be stressed during a lifting of adhesion membrane 101.

In the illustrated implementations, membrane lifting post 113 is spring loaded with an adhesion membrane relaxer spring 115. Adhesion membrane relaxer spring 115 may be a resilient helical spring, and in some applications, spring 115 should be able to support no less than about 40,000 cycles. The number of cycles more generally depends on the application or expected use and useful life of suction-security system 100. Adhesion membrane lifting post 113 fits and extends through the center of the adhesion membrane relaxer helical spring 115 and through the center hole of a reinforcement bushing 106 mounted in anti-pry structure 130. Reinforcement bushing 106 may particularly be molded into anti-pry structure 130 and may be constructed of a strong material such as a hard aluminum or steel as reinforcement bushing 106 may be stressed by the movement of adhesion membrane lifting post 113 and by rotational ramp swing arm 107, particularly where rotational ramp swing arm 107 meets the top of adhesion membrane lifting post 113. Whether or not reinforcement bushing 106 is molded into anti-pry structure 130, reinforcement bushing 106 may, in some implementations, be knurled or may have other or additional features to hold bushing 106 firmly to anti-pry structure 130.

Reinforcement bushing 106 may have a channel or hole drilled and used as a security locking pin reinforcement bushing channel 112. The diameter of channel 112 may be only slightly larger than that of a security locking pin 110 to allow for non-binding movement of locking pin 110 into or out of channel 112, and channel 112 may be deep enough for full inclusion of pin 110 within channel 112. Additionally, in some implementations, reinforcement bushing 106 may be made of a non-ferrous material, for example, if an implementation requires security locking pin 110 to be magnetized as described below.

Figure 3A:
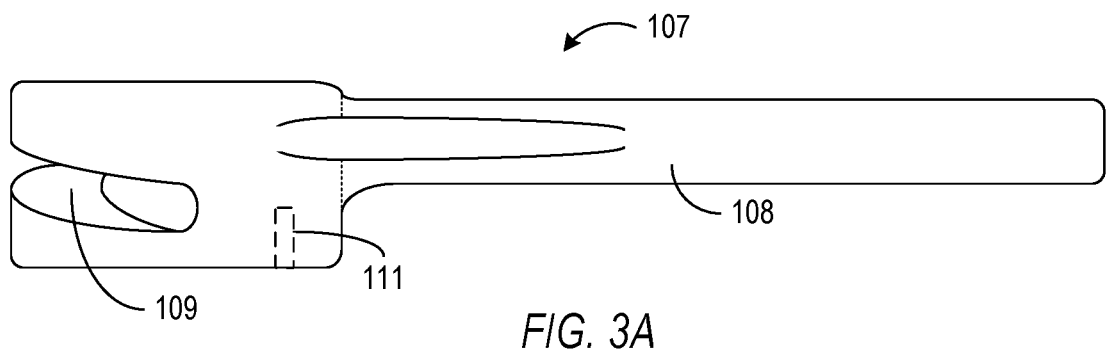
FIG. 3A is a side view of a rotational ramp swing arm.
Figure 3B:
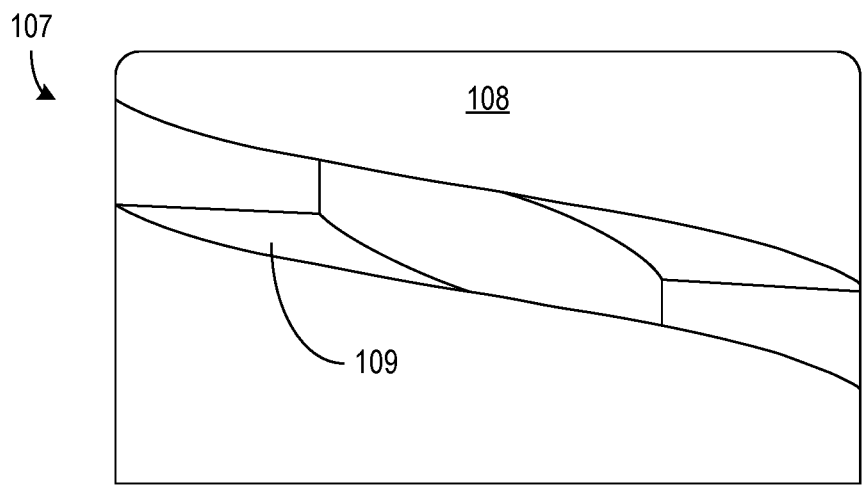
FIG. 3B is the front view of the rotational ramp swing arm of FIG. 3A.

Membrane lifting post 113, which extends through reinforcement bushing 106, connects to an activation mechanism that lifts membrane lifting post 113. In the embodiment of suction-security system 100, the activation mechanism includes a rotational ramp swing arm 107, which is rotatable about an axis of membrane lifting post 113. FIGS. 3A and 3B show side and front views of one implementation of rotational ramp swing arm 107 and particularly show a helically inclined ramp surface 109 that may be formed in a hub of rotational ramp swing arm 107. Implementations using optional security locking pin 110 may have security locking pin swing arm channel 111 provided in rotational ramp swing arm 107 during manufacturing of rotational ramp swing arm 107. Locking pin swing arm channel 111 may have a diameter and depth only slightly larger than the diameter and length of locking pin 110 to allow for non-binding movement of locking pin 110 into channel 111, and full inclusion of locking pin 110 in channel 111 when locking pin 110 is not engaged with reinforcement bushing channel 112.

A portion of membrane lifting post 113 extends into or through the hub of rotational ramp swing arm 107. A pin 114 in the portion of membrane lifting post 113 extending into rotational ramp swing arm 104 slides on helically inclined ramp surface 109, so that rotation of rotational ramp swing arm 107 from the position shown in FIG. 1A to the position shown in FIG. 1B lifts pin 114, membrane lifting post 113, and the central portion of membrane 101.

Suction-security system 100 may be mechanically to an item defining an enclosure so that lift mechanism 140 is inside the enclosure and membrane 101 and at least a portion, e.g., extension 103, of anti-pry structure 130 is outside the enclosure. The bottom surfaces of membrane 101 and anti-pry structure 130 can then be placed on anchor surface 150. Rotation of rotational ramp swing arm 107 causes swing arm lifting ramp surface 109 to lift pin 114 and therefore lifting post 113 vertically, i.e., along the axis of rotation of swing arm 107. The rotation necessary to activate lift mechanism 140 may be less than a full turn, e.g., about 180° of rotation, which allows for quick and easy application to adhere suction-security device 100 to anchor surface 150. As an alternative to using pin 114 and helical ramp surface 109, lifting post 113 and swing arm 107 may respectively have coarse male and female threading that similarly lifts lifting post 113 when swing arm 107 rotates, but pin 114 and ramp surface 109 may provide a stronger or more durable mechanism for rapid lift within a 180° rotation. The rotation of ramp swing arm 107 is in a plane parallel to anchor surface 150 and allows a much lower profile for suction-security system 100 than would a lever mechanism activated by movement in the lift direction. Rotational ramp swing arm 107 may also be implemented as a one-piece structure, which may reduce manufacturing costs when compared to a more complex lift structure, e.g., using multiple screw type mechanisms or lifts requiring high vertical clearance.

Rotational ramp swing arm 107 is stressed primarily at the fulcrum of handle 108, and on the surface of swing arm lifting ramp surface 109 as ramp surface 109 lifts lifting post pin 114 and pin 114 rides up ramp surface 109 during lifting of adhesion membrane 101. To more evenly accommodate this load, swing arm lifting ramp surface 109 may be manufactured so that the ramp profile maintains contact with the entire engaged length of the adhesion membrane lifting post ramp pin 114. Rotational ramp swing arm 107 and adhesion membrane lifting post ramp pin 114 may be designed to be resilient over many use, e.g., no less than about 40,000 cycles; a number that is only suggested and depends on the overall use model of the suction-security system. In some specific implementations, rotational ramp swing arm 107 may be made of stainless steel, hardened aluminum, or hardened polymer, depending upon desired life expectancy, weight, cost, and other factors depended on the intended use of suction-security device 100. A non-ferrous material would be used in an implementation that employs a locking pin 110 and related components.

Ramp pin 114 may be fit in a hole through adhesion membrane lifting post 113. In implementations employing a locking pin 110, the hole through adhesion membrane lifting post 113 for ramp pin 114 may be above the security locking pin channel 112 to allow the lowest part of the swing arm lifting ramp surface 109 to fit under lifting post ramp pin 114. Lifting post ramp pin 114 may extend the width of the top of adhesion membrane lifting post 113 plus the width of the swing arm lifting ramp surface 109, so that one end of lifting post ramp pin 114 is flush with the exterior of swing arm lifting ramp surface 109 and the other end of lifting post ramp pin 114 is flush with the exterior of the adhesion membrane lifting post 113. Lifting post ramp pin 114 should be a suitably strong and inflexible material to accommodate stress during the lifting process along the swing arm lifting ramp surface 109 and at the junction of adhesion membrane lifting post 113.

A user when beginning to activate lift mechanism 140 to create suction and attachment of suction-security system 100 to anchor surface 150 may apply downward pressure at the top of anti-pry structure 130, e.g., apply pressure near or on rotational ramp swing arm 107, so that anti-pry external structure 130 contacts anchor surface 150 and adhesion membrane depression wall 104 of anti-pry structure 130 contacts the top of adhesion membrane 101 around the perimeter of adhesion membrane 101. Membrane relaxer spring 115 may be under partial tension at this point. Rotation of rotational ramp swing arm 107 by about 180° provides lift of adhesion membrane lifting post 113 through the external structure of reinforcement bushing 106 as swing arm lifting ramp surface 109 forces adhesion membrane lifting post ramp pin 114 vertically upward. A suitable vacuum thus created between adhesion membrane 101 and anchor surface 150 securely attaches suction-security system 100 to anchor surface 150, and contact between the perimeter of membrane 101 and a sufficiently smooth anchor surface 150 will maintain adequate vacuum and secure attachment for an extended time, e.g., up to a few days or more.

Anti-pry structure 130 may prevent unauthorized release of the vacuum by shielding adhesion membrane 101, e.g., preventing undesired lifting of the outer edge of adhesion membrane 101. In general, a base portion of anti-pry structure 130 may contact (or be in close proximity) with anchor surface 150 to prevent insertion of a pry bar or tool under anti-pry structure 130. Further, anti-pry structure 130 may include extension 103, extending well beyond the edges of central portion 102 surrounding membrane 101. In one specific implementation, adhesion membrane 101 and the central portion of anti-pry structure 130 may be about 4 inches in diameter, and optional extension 103 may extend about 2 inches beyond the perimeter of membrane 101. Extension 103 may be shorter, e.g., about ½ inch tall, than central portion 102, e.g., about ¾ inch tall, since extension 103 does not need to be tall enough to contain adhesion membrane 101. Extension 103 may further inhibit access to membrane 101 and provide large moment arm to resist prying at the edges of anti-pry structure 130. The size of the optional anti-pry structure extension 103 may depend on the application in which suction-security system 100 is employed. For example, suction-security system 100 may be employed in an enclosure such as a briefcase that is large enough that the extent of the briefcase sufficiently inhibits access to membrane 101, in which case anti-pry extension 103 may not be required.

Anti-pry structure 130 may also help prevent an attempt to break adhesion through attempted lateral or rotational movement of suction-security system 100. In particular, reinforcement bushing 106 may permit externally accessible portions of anti-pry structure 130 to rotate about lifting post 113 and adhesion membrane 101. Further, some implementations such as suction-security system 200 of FIG. 2 replace membrane depression wall 104, which may contact adhesion membrane 101, with rotatable depression wall ring 105. Depression wall ring 105 may be a ring that resides inside of the remainder of anti-pry external structure 135 of suction-security system 200. As a result, if an unauthorized person manages to rotate an external portion of anti-pry structure 135, wall ring 105 and membrane lifting post 113 do not rotate with the external portion of anti-pry structure 135 and do not transfer the rotation to adhesion membrane 101. Suction-security system 200 can remain attached to anchor surface 150 even when rotated. Suction-security system 200 of FIG. 2 may otherwise be identical to suction-security system 100 of FIGS. 1A, 1B, and 1C as described herein.

Suction-security system 100 may further employ a security mechanism to prevent unauthorized rotation of swing arm 107. The illustrated embodiment of suction-security system 100 employs locking pin 110 that fits in swing arm channel 111 in swing arm 107 and is able to at least partially slip into bushing channel 112 in reinforcement bushing 106 when rotation ramp swing arm 107 is in the locked position shown in FIG. 1B. (The locked position corresponds to the adhered position.) Swing arm channel 111 in rotational ramp swing arm 107, locking pin 110, and bushing channel 112 in bushing 106 may be reinforced or made of strong material to resist sheering if rotation of arm 107 is attempted while locking pin 110 bridges both swing arm channel 111 and bushing channel 112. In one implementation, locking pin 110 is iron or another ferromagnetic material and may be magnetically lifted out of bushing channel 112 using a magnet to unlock rotation. In another implementation, locking pin 110 is magnetized and may be magnetically lifted out of or pushed into bushing channel 112 using a magnet to lock or unlock rotation of rotational ramp swing arm 107.

Figure 4:
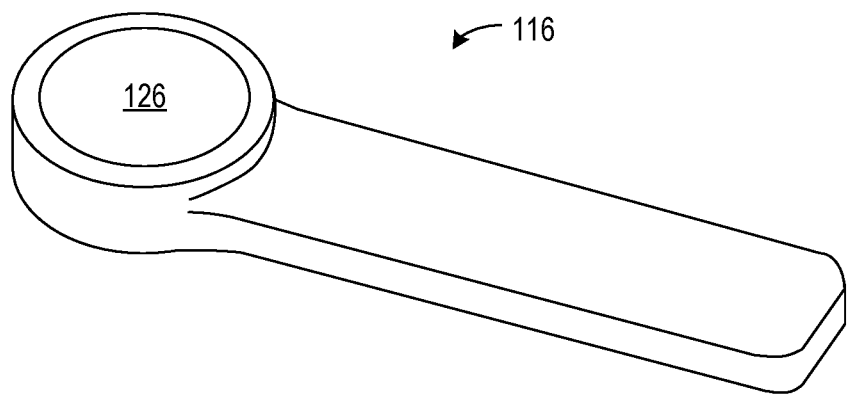
FIG. 4 shows a magnetic key fob for use with a suction-security system having magnetically keyed activation mechanism.

FIG. 4 shows an optional magnetic key fob 116 that may be used to move locking pin 110 between swing arm channel 111 and bushing channel 112. In some implementations, optional magnetic key fob 116 is used to both engage and disengage the rotational ramp swing arm optional security locking pin 110. Magnetic key fob 116 may be formed of a polymer or other suitable material with a Neodymium or Rare Earth magnet 126 imbedded in fob 116. Depending on the application, locking pin 110 may also be magnetized to allow magnetic key fob 116 to be turned so that the side of the magnet in fob 116 facing the hub of swing arm 101 attracts locking pin 110 or be turned so that the opposite side of the magnet in fob 116 faces the hub of swing arm 101 and repels locking pin 110. With a magnetized locking pin 110, magnetic key fob 116 may be used to push locking pin 110 to bridge swing arm channel 111 and bushing channel 112 to lock rotational swing arm 107 when suction has been activated or may be used to lift (or push) locking pin 110 free of one of swing arm channel 111 and bushing channel 112 to unlock rotational arm 107 and permit rotation to release the suction.

Figure 5:
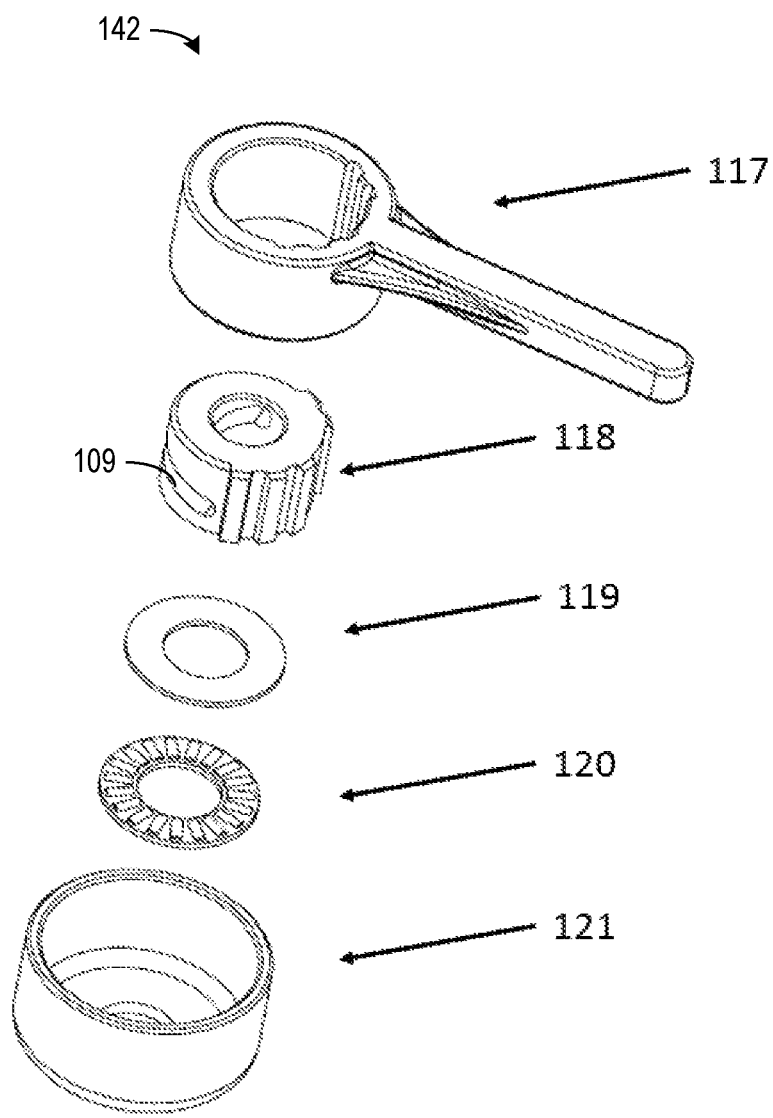
FIG. 5 shows an exploded view of an example keyed swing arm for use in a suction-security system.

Another optional modification to a rotational ramp swing arm is shown in FIG. 5. FIG. 5 particularly shows an exploded view of one implementation of a mechanically keyed rotational ramp swing arm 142. Mechanically keyed rotational ramp swing arm 142 includes a removable rotational ramp swing arm keyed socket 117 that a user can separate from the remainder of keyed rotational ramp swing arm 142 to thereby prevent the rotation of swing arm lifting ramp surface 109. In FIG. 5, swing arm lifting ramp surface 109 is within a swing arm lifting ramp keyed nut 118, which is turned by coupling rotational ramp swing arm keyed socket 117 to swing arm lifting ramp keyed nut 118 and rotating rotational ramp swing arm keyed socket 117. Swing arm lifting ramp keyed nut 118 rides on a thrust washer 119 and a needle bearing 120 through which membrane lift post 113 passes. A rotational ramp swing arm key guard 121 surrounds swing arm lifting ramp keyed nut 118 to prevent or inhibit use of a tool, other than rotational ramp swing arm keyed socket 117, from engaging with and rotating swing arm lifting ramp keyed nut 118. FIG. 5 only shows one example of a key pattern, but a sufficient number of alternative patterns may be provided in different suction-security systems to reduce duplications of the same key patter potentially being utilized in close proximity to each other. Mechanically keyed rotational ramp swing arm 142 can be used in place of rotational ramp swing arm 107 in suction-security system 100 or 200.

Rotational ramp swing arm keyed socket 117 and swing arm lifting ramp keyed nut 118 may be made of a stainless steel, hardened aluminum, or hardened polymer, depending upon desired life expectancy, weight, cost, and other factors. The thrust washer 119 is a common load bearing element and can be made of the same materials. Thrust needle bearing 120 is typically a hardened chrome steel and should be able to handle a minimum of 40,000 cycles; a number that is only suggested and should be validated within the overall use model of the suction-security system. The rotational ramp swing arm key guard 121 may be stainless steel so as to resist breaking with common hand tools. In general, the rotational ramp swing arm optional security locking pin 110, swing arm channel 111, and bushing channel 112 are not required or used in implementations using mechanically keyed rotational ramp swing arm 142.

Figure 6:
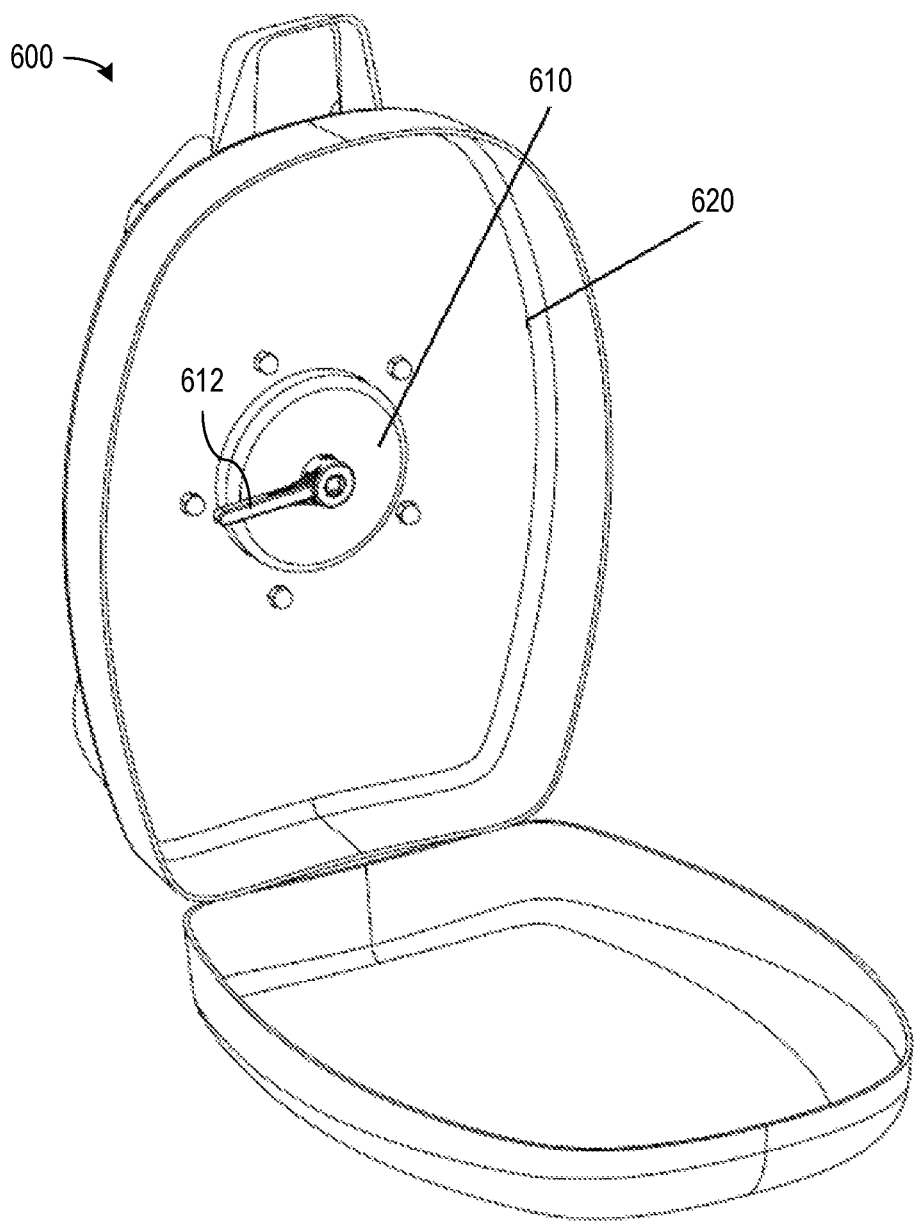
FIG. 6 shows an example of a backpack including a suction-security system with an activation mechanism inside an enclosure of the backpack.

Suction-security systems such as disclosed herein may be employed to secure any desired object, e.g., through attachment cables or other structures that connect a suction-security device to the object being secured. In some implementations, a suction-security system may be built into the object being secured. FIG. 6 shows an example of a low-profile suction-security system integrated into a backpack 600. In particular, suction-security system 610 may be mounted through and attached to a wall of an enclosure 620 of backpack 600. Suction-security system 610 may be in accordance with any of the implementations disclosed herein and is mounted so that an activation control 612 of a lift mechanism of suction security system 610 is located in the interior of enclosure 620. Activation portion 612 may particularly include a rotational ramp swing arm as described above. An adhesion membrane (not visible in FIG. 6) of suction-security system 610 is located outside of enclosure 620. Backpack 600 may be secured by pressing the external adhesion membrane and external portions of an anti-pry structure against a suitable anchor surface and rotating activation control 612 to activate suction. For a backpack 600 in which enclosure 620 may not be lockable, suction-security system 610 may be magnetically lockable or mechanically lockable as described above to prevent unauthorized removal or movement of backpack 600.

Suction security systems may similarly be applied in other types of flexible material enclosures such as a purse. In such uses, whether the suction-security system is lockable or not, the suction security system may still prevent "snatch and go" thefts of the purses, backpacks, and other flexible material enclosures by preventing movement of the enclosure from an anchor surface.

Figure 7:
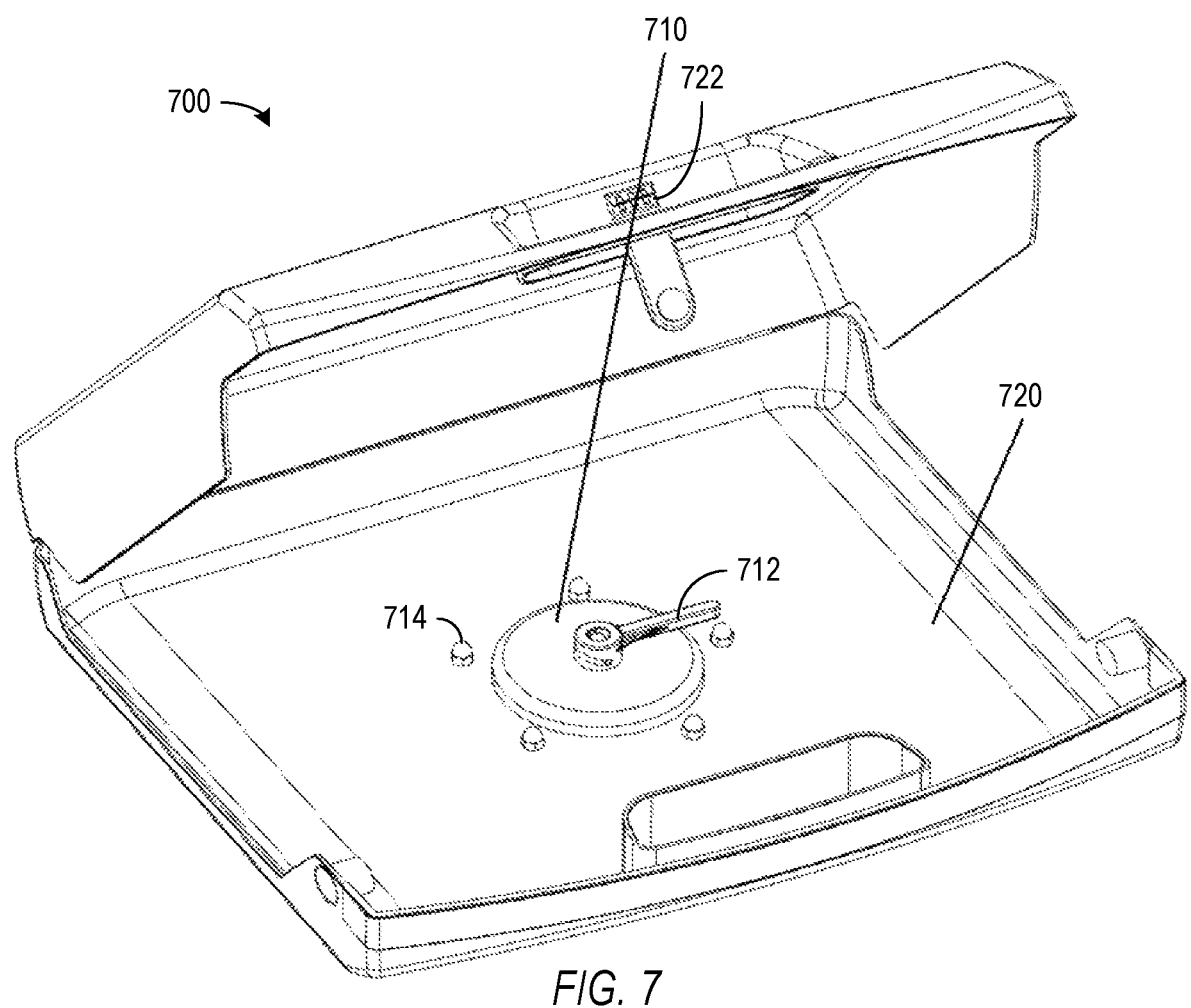
FIG. 7 shows an example of the case including a suction-security system with an activation mechanism inside an enclosure of the case.

FIG. 7 shows a case 700 incorporating a low-profile suction-security system 710 mounted in a wall of an enclosure 720 of case 700. Case 700 may be a hard-walled structure such as a briefcase, a laptop case, or a suitcase. Suction-security system 710 may be a low-profile suction-security system of minimized height so that the remaining space in enclosure 720 is sufficient to secure desired contents of case 720. Suction-security system 710 may be in accordance with any of the implementations disclosed herein and is mounted so that an activation control 712 of a lift mechanism of suction-security system 710 is located in the interior of enclosure 720. An adhesion membrane (not visible in FIG. 7) of suction-security system 710 is located outside of enclosure 720. Case 700 may be secured by pressing the external adhesion membrane and external portions of an anti-pry structure of suction-security system 710 against a suitable anchor surface, rotating activation control 712 to activate suction, and then closing enclosure 720 so that activation control 712 is enclosed within briefcase 700. Briefcase 700 further has a lock 722 that may be locked to prevent unauthorized access to activation control 712. Accordingly, suction-security system 710 does not need to be lockable but may optionally be magnetically lockable or mechanically lockable as described above to prevent unauthorized removal or movement of briefcase 700.

In one implementation, suction-security system 710 is identical to suction-security system 100, and central portion 102 of anti-pry structure 130 suction-security system 100 extends through a hole in a wall of enclosure 720. Fasteners 714, e.g., bolts or rivets, also extend through respective holes in the wall of enclosure 720 and fasten to extension 103 of anti-pry structure 130 of suction-security system 100. With a low profiled system, the portion of suction-security system 100 inside enclosure 720 may be about 1.5 inches tall or less.

In another implementation, a clear or windowed case with an integrated suction security system can be employed in a store such as a jewelry store or other commercial environment that sells items that may need to be secured while being displayed. For example, case 700 may have a transparent or windowed top, so that enclosure 720 can provide a secure semi-portable display case for expensive items. Case 700 may be moved and secured as needed for potential buyers to observe items in case 700, for example, during a side-by-side comparisons with items in another case. The securable mobility of case 700 may be more convenient than having items separated and secured at great distance from each other inside of large glass cases.

The suction-security systems as disclosed herein may be used to secure items against theft as described above and may also be used to secure items for use. In particular, an item may be secured to an anchor surface in a moving environment to prevent shifting of the item. In an automobile or a plane, for example, the anchor surface may be a tray table or the back of a seat, or in a boat on open and rough seas, the anchor surface may be the deck of the boat. The suction-security systems may also be used to provide a stable working platform in working environments, for example, where technicians may hold equipment in place by attaching a suction system of the equipment to smooth surfaces such as the surfaces of junction boxes or panels. For such attachments, the anchor surface may be horizontal, inclined, or even horizontal, and the suction may still fix the item in place.

Although suction-security systems have been explained in specific uses, there are many other use cases, modifications, and variations possible further implementations within the scope of the following claims.

What is claimed is:

1. A suction-security system comprising:
   an adhesion membrane;
   a shield surrounding a top of the adhesion membrane;
   a post coupled to a central portion of the adhesion membrane, the post extending through the shield;
   a pin set in the post; and
   a swing arm including a hub through which a portion of the post extends, the hub including a helical inclined surface on which the pin rides such that rotation of the swing arm by less than a full turn about an axis extending through the post lifts the post in a direction along the axis and lifts the central portion of the adhesion membrane sufficiently to adhere the adhesion membrane to an anchor surface in contact with a portion of the adhesion membrane.

2. The system of claim 1, wherein the swing arm comprises:
   a keyed nut including the helical inclined surface; and
   a socket shaped to detachably engage the keyed nut during the rotation of the swing arm.

3. The system of claim 1, further comprising a locking pin, wherein:
   when the swing arm is in a position lifting the central portion of the adhesion membrane, the locking pin is movable between a first channel in the swing arm and a second channel in the shield; and
   the locking pin extending simultaneously into both the first channel and the second channel prevents rotation of swing arm.

4. The system of claim 3, wherein the locking pin is ferromagnetic and movable out of the second channel using a magnet above the swing arm.

5. The system of claim 3, wherein the locking pin is magnetized and responds to a magnet above the swing arm by moving in a first direction into the first channel or moving in a second direction into the second channel depending on an orientation of the magnet.

6. The system of claim 1, wherein the shield comprises a wall positioned to contact a top surface of the adhesion membrane adjacent to a perimeter of the adhesion membrane.

7. The system of claim 6, wherein the wall is sized and positioned to press on the perimeter of the adhesion membrane when the shield and membrane are pressed against a flat surface.

8. The system of claim 6, wherein the wall comprises a ring positioned to contact the top surface of the adhesion membrane adjacent to the perimeter of the adhesion membrane, the ring being rotatable relative to other portions of the shield.

9. The system of claim 1, wherein the shield comprises a bushing through which the post extends, the bushing making at least a portion of the shield rotatable about the post.

10. The system of claim 1, wherein the shield comprises:
a central portion surrounding the top of the adhesion membrane; and
an extension extending from the central portion.

11. The system of claim 10, wherein the extension comprises mounting structure for attachment of the suction security system to an enclosure with the extension being outside the enclosure and the central portion extending into an interior of the enclosure.

12. The system of claim 1, further comprising an enclosure, wherein the shield is attached to the enclosure and positioned so that the adhesion membrane is outside the enclosure and the swing arm is inside the enclosure.

13. The system of claim 12, wherein the enclosure is selected from a display case, a briefcase, a laptop case, a suitcase, or a backpack.

14. The system of claim 12, wherein when adhered to the anchor surface, the suction system provides the enclosure with stability from shifting.

15. A suction-security system comprising:
an adhesion membrane;
a shield surrounding a top of the adhesion membrane;
a post coupled to a central portion of the adhesion membrane, the post extending through the shield;
a swing arm coupled to the post such that rotation of the swing arm about an axis extending through the post lifts the post in a direction along the axis and lifts the central portion of the adhesion membrane in the direction along the axis; and
a locking pin, wherein:
when the swing arm is in a position lifting the central portion of the adhesion membrane, the locking pin is movable between a first channel in the swing arm and a second channel in the shield; and
the locking pin extending simultaneously into both the first channel and the second channel prevents rotation of swing arm.

16. The system of claim 15, wherein the locking pin is movable out of the second channel using a magnet adjacent to the swing arm.

17. The system of claim 1, wherein engagement of the pin with the inclined surface limits rotation of the swing arm to less than a full turn about the axis extending through the post.

* * * * *